US011678380B2

(12) United States Patent
Ly et al.

(10) Patent No.: US 11,678,380 B2
(45) Date of Patent: Jun. 13, 2023

(54) REPETITION OF A MESSAGE 3 COMMUNICATION OF A FOUR-STEP RANDOM ACCESS CHANNEL PROCEDURE

(71) Applicant: QUALCOMM Incorporated, San Diego, CA (US)

(72) Inventors: Hung Dinh Ly, San Diego, CA (US); Wei Yang, San Diego, CA (US); Krishna Kiran Mukkavilli, San Diego, CA (US); Gokul Sridharan, Sunnyvale, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/302,771

(22) Filed: May 12, 2021

(65) Prior Publication Data

US 2021/0410192 A1    Dec. 30, 2021

Related U.S. Application Data

(60) Provisional application No. 63/045,560, filed on Jun. 29, 2020.

(51) Int. Cl.
*H04W 74/08* (2009.01)
*H04W 72/23* (2023.01)
*H04W 74/00* (2009.01)
*H04W 72/21* (2023.01)
*H04L 5/00* (2006.01)

(52) U.S. Cl.
CPC ....... *H04W 74/0833* (2013.01); *H04W 72/21* (2023.01); *H04W 72/23* (2023.01); *H04W 74/008* (2013.01); *H04L 5/0055* (2013.01)

(58) Field of Classification Search
None
See application file for complete search history.

(56) References Cited

U.S. PATENT DOCUMENTS

| 10,517,083 B2 * | 12/2019 | You ................. H04L 5/0053 |
| 10,652,872 B2 * | 5/2020 | You ................. H04W 88/06 |

(Continued)

FOREIGN PATENT DOCUMENTS

| WO | WO-2019216818 A1 | 11/2019 |
| WO | 2021004833 A1 | 1/2021 |

OTHER PUBLICATIONS

Ericsson: "Random Access for MTC", 3GPP Draft, 3GPP TSG RAN WG1 Meeting #83, R1-156420, Random Access for MTC, 3rd Generation Partnership Project (3GPP),Nov. 15, 2015-Nov. 22, 2015 Nov. 15, 2015 (Nov. 15, 2015), XP051002888, pp. 1-10 (Year: 2015).*

(Continued)

*Primary Examiner* — Faiyazkhan Ghafoerkhan
(74) *Attorney, Agent, or Firm* — Harrity & Harrity, LLP

(57) ABSTRACT

Various aspects of the present disclosure generally relate to wireless communication. In some aspects, a user equipment (UE) may determine a number of repetitions of a message 3 (msg3) communication of a four-step random access channel (RACH) procedure that are to be transmitted to a base station. The UE may transmit, to the base station, the repetitions of the msg3 communication based at least in part on determining the number of the repetitions of the msg3 communication. Numerous other aspects are provided.

74 Claims, 7 Drawing Sheets

(56) References Cited

U.S. PATENT DOCUMENTS

| | | | | |
|---|---|---|---|---|
| 10,743,350 | B2* | 8/2020 | Tirronen | H04W 74/0833 |
| 11,290,215 | B2* | 3/2022 | Tirronen | H04L 1/1887 |
| 11,483,843 | B2* | 10/2022 | Sun | H04W 24/10 |
| 2020/0383119 | A1* | 12/2020 | Sun | H04L 5/0053 |
| 2021/0051707 | A1* | 2/2021 | Rastegardoost | H04L 5/0051 |
| 2021/0235503 | A1* | 7/2021 | Irukulapati | H04W 74/0833 |
| 2021/0410192 | A1* | 12/2021 | Ly | H04W 72/21 |
| 2022/0046552 | A1* | 2/2022 | Xu | H04W 52/245 |
| 2022/0070943 | A1* | 3/2022 | Xu | H04W 74/0841 |
| 2022/0095136 | A1* | 3/2022 | Beale | H04W 24/10 |
| 2022/0210806 | A1* | 6/2022 | Rastegardoost | H04L 5/0051 |
| 2022/0312488 | A1* | 9/2022 | Abedini | H04W 74/0833 |
| 2022/0322450 | A1* | 10/2022 | Taherzadeh Boroujeni | H04L 5/001 |
| 2023/0028843 | A1* | 1/2023 | Sun | H04W 52/365 |

OTHER PUBLICATIONS

Elsaadany M., et al., "Cellular LTE-A Technologies for the Future Internet-of-Things: Physical Layer Features and Challenges", IEEE Communications Surveys & Tutorials, vol. 19, No. 4, Fourth Quarter 2017, pp. 2544-2572.

Wang Y-P.E., et al., "A Primer on 3GPP Narrowband Internet of Things (NB-IoT)", Jun. 13, 2016, XP002772811, 8 pages, Retrieved from the Internet: URL:https://arxiv.org/ftp/arxiv/papers/1606/1606.04171.pdf.

Ericsson: "Random Access for MTC", 3GPP Draft, 3GPP TSG RAN WG1 Meeting #83, R1-156420, Random Access for MTC, 3rd Generation Partnership Project (3GPP), Mobile Competence Centre, 650, Route Des Lucioles, F-06921 Sophia-Antipolis Cedex, France, vol. RAN WG1, No. Anaheim, USA, Nov. 15, 2015-Nov. 22, 2015 Nov. 15, 2015 (Nov. 15, 2015), XP051002888, pp. 1-10, Retrieved from the Internet: URL:http://www.3gpp.org/ftp/Meetings_3GPP_SYNC/RAN1/Docs/ [retrieved on Nov. 15, 2015] section 6, Proposals on Msg3/Msg4 Scheduling and Transmission.

Ericsson: "Remaining Issues of UL Data Transmission Procedure", 3GPP Draft, 3GPP TSG-RAN WG1 Meeting #93, Tdoc R1-1807258 Remaining Details of UL Transmission Procedure, 3rd Generation Partnership Project (3GPP), Mobile Competence Centre, 650, Route Des Lucioles, F-06921 Sophia-Antipolis Cedex vol. RAN WG1, No. Busan, Korea, May 21, 2018-May 25, 2018 May 20, 2018 (May 20, 2018), XP051442454, pp. 1-3, Retrieved from the Internet: URL:http://www.3gpp.org/ftp/Meetings%5F3GPP%5FSYNC/RAN1/Docs/ [retrieved on May 20, 2018] proposal 2 proposal 1.

International Search Report and Written Opinion—PCT/US2021/070547—ISA/EPO—dated Sep. 29, 2021.

* cited by examiner

REPETITION OF A MESSAGE 3 COMMUNICATION OF A FOUR-STEP RANDOM ACCESS CHANNEL PROCEDURE

CROSS-REFERENCE TO RELATED APPLICATION

This patent application claims priority to U.S. Provisional Patent Application No. 63/045,560, filed on Jun. 29, 2020, entitled "REPETITION OF A MESSAGE 3 COMMUNICATION OF A FOUR-STEP RANDOM ACCESS CHANNEL PROCEDURE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for repetition of a message 3 (msg3) communication of a four-step random access channel (RACH) procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: determining a number of repetitions of a message 3 (msg3) communication of a four-step random access channel (RACH) procedure that are to be transmitted to a base station; and transmitting, to the base station, the repetitions of the msg3 communication based at least in part on determining the number of the repetitions of the msg3 communication.

In some aspects, a method of wireless communication performed by a base station includes: transmitting, to a UE, a message 2 (msg2) communication of a four-step RACH procedure; and receiving, from the UE, repetitions of a msg3 communication of the four-step RACH procedure.

In some aspects, a UE for wireless communication includes: a memory and one or more processors coupled to the memory, the one or more processors configured to: determine a number of repetitions of a msg3 communication of a four-step RACH procedure that are to be transmitted to a base station; and transmit, to the base station, the repetitions of the msg3 communication based at least in part on determining the number of the repetitions of the msg3 communication.

In some aspects, a base station for wireless communication includes: a memory and one or more processors coupled to the memory, the one or more processors configured to: transmit, to a UE, a msg2 communication of a four-step RACH procedure; and receive, from the UE, repetitions of a msg3 communication of the four-step RACH procedure.

In some aspects, a non-transitory computer-readable medium storing a set of instructions for wireless communication includes: one or more instructions that, when executed by one or more processors of a UE, cause the UE to: determine a number of repetitions of a msg3 communication of a four-step RACH procedure that are to be transmitted to a base station; and transmit, to the base station, the repetitions of the msg3 communication based at least in part on determining the number of the repetitions of the msg3 communication.

In some aspects, a non-transitory computer-readable medium storing a set of instructions for wireless communication includes: one or more instructions that, when executed by one or more processors of a base station, cause the base station to: transmit, to a UE, a msg2 communication of a four-step RACH procedure; and receive, from the UE, repetitions of a msg3 communication of the four-step RACH procedure.

In some aspects, an apparatus for wireless communication at a user equipment includes: means for determining a number of repetitions of a msg3 communication of a four-step RACH procedure that are to be transmitted to a base station; and means for transmitting, to the base station, the repetitions of the msg3 communication based at least in part on determining the number of the repetitions of the msg3 communication.

In some aspects, an apparatus for wireless communication at a base station includes: means for transmitting, to a UE, a msg2 communication of a four-step RACH procedure; and means for receiving, from the UE, repetitions of a msg3 communication of the four-step RACH procedure.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
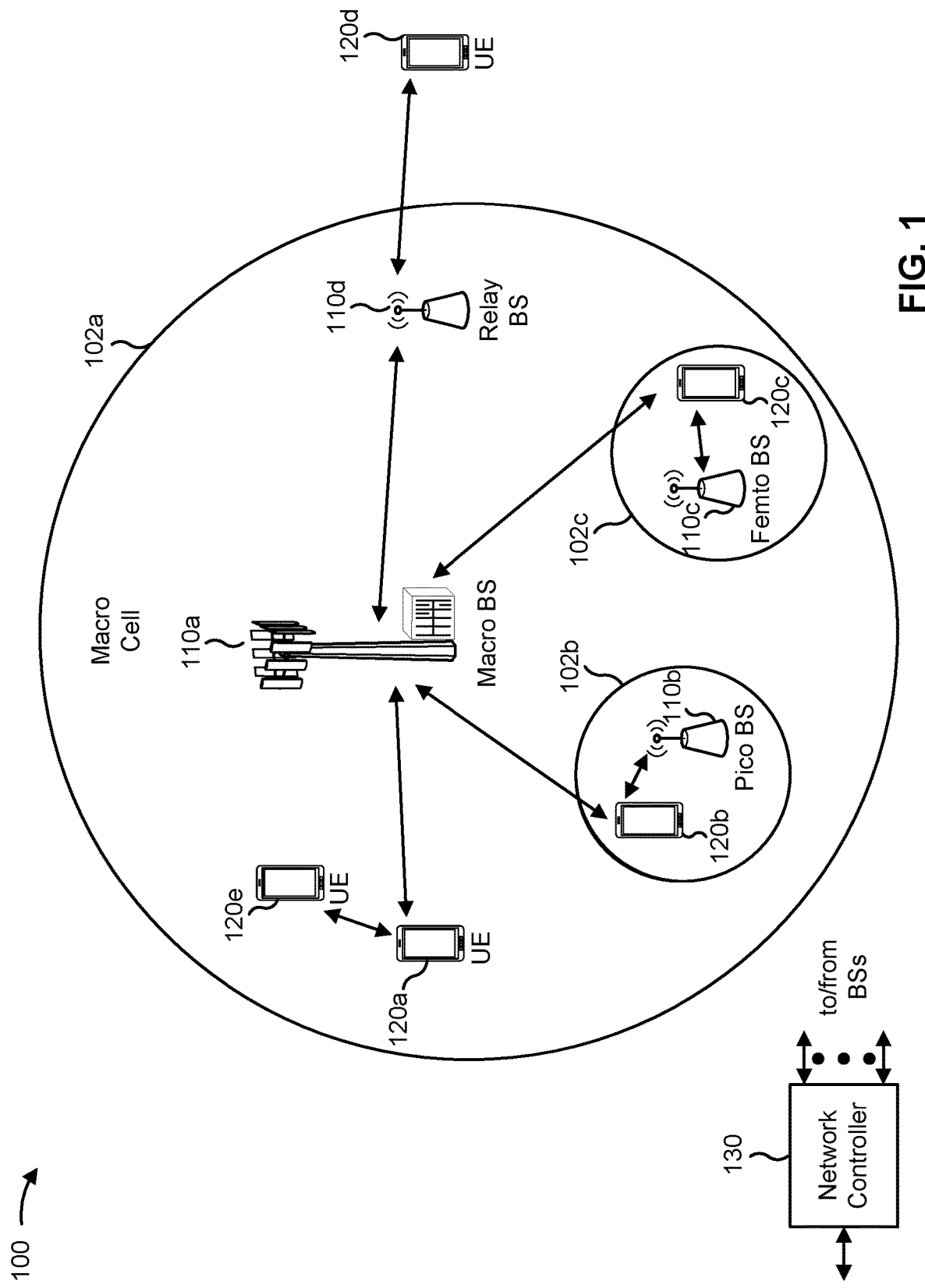
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
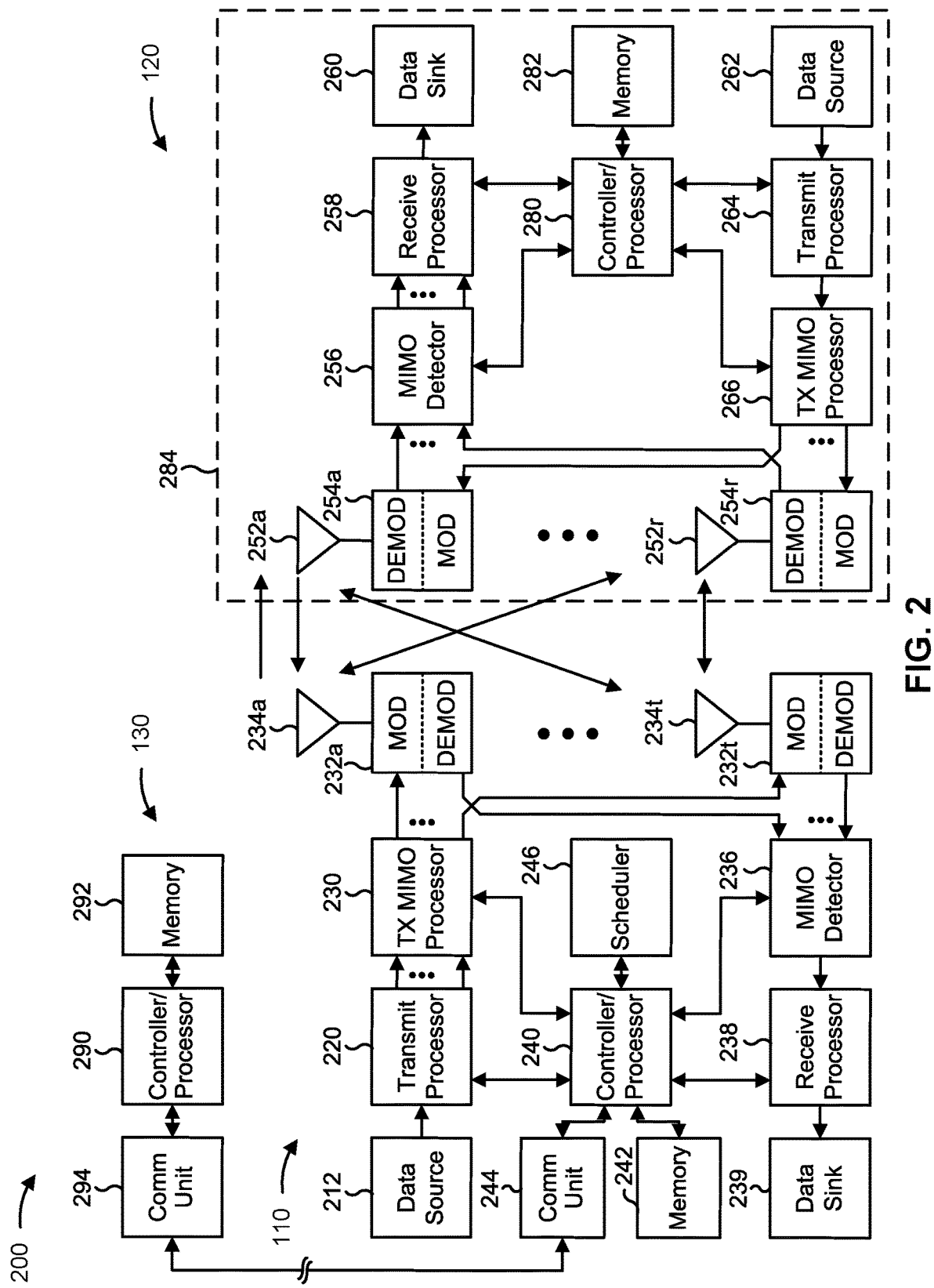
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-7).

Controller/processor 240 of base station 110, controller/processor 280 of UE 120, and/or any other component(s) of FIG. 2 may perform one or more techniques associated with repetition of a message 3 (msg3) communication of a four-step RACH procedure, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for determining a number of repetitions of a msg3 communication of a four-step RACH procedure that are to be transmitted to a base station, means for transmitting, to the base station, the repetitions of the msg3 communication based at least in part on determining the number of the repetitions of the msg3 communication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a number of repetitions of a msg3 communication of a four-step RACH procedure that are to be transmitted by a UE, means for receiving, from the UE, the repetitions of the msg3 communication based at least in part on determining the number of repetitions of the msg3 communication, and/or the like. In some aspects, base station 110 may include means for transmitting, to a UE, a msg2 communication of a four-step random access channel (RACH) procedure, means for receiving, from the UE, repetitions of a msg3 communication of the four-step RACH procedure, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
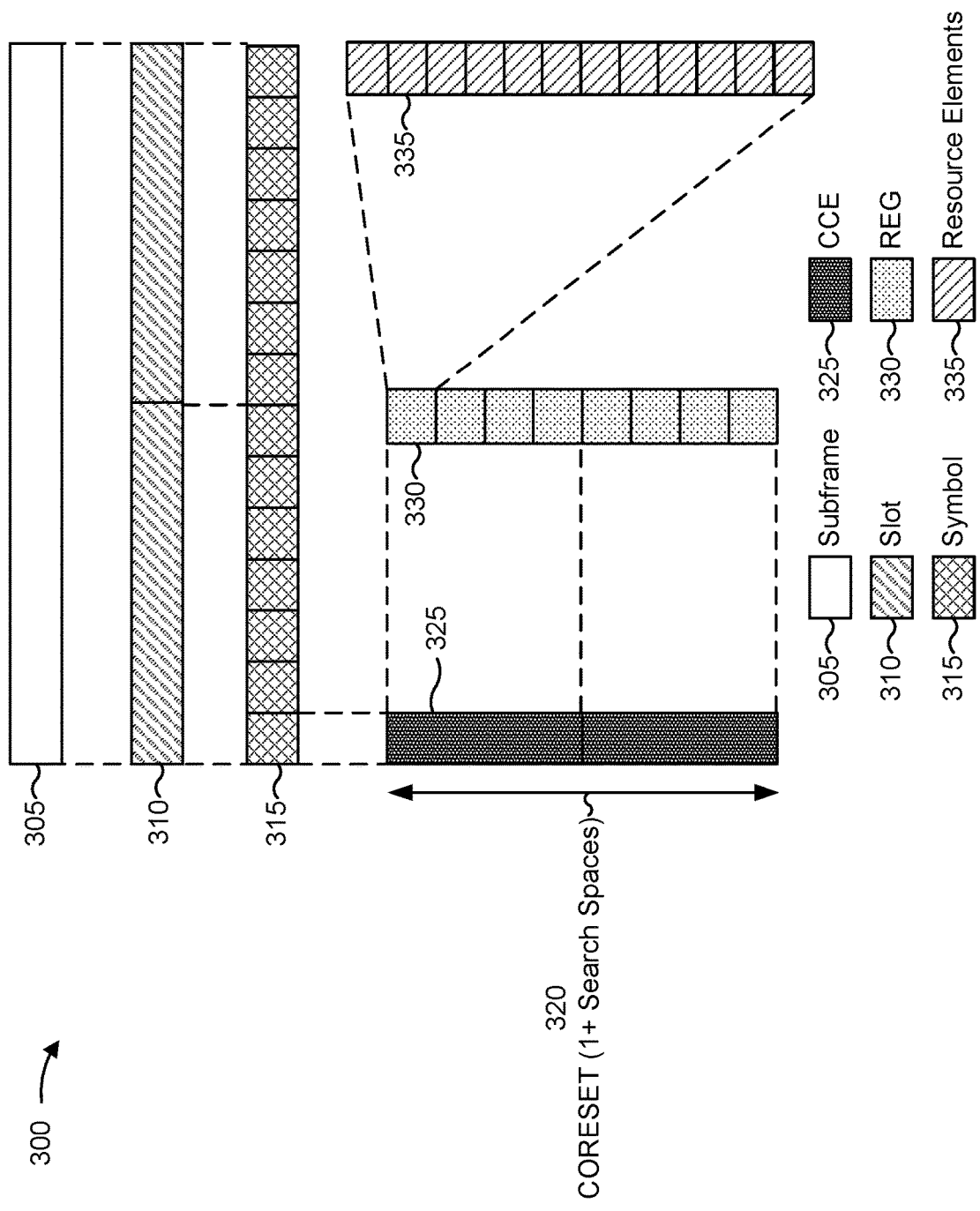
FIG. 3 is a diagram illustrating an example resource structure for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, and/or the like). In some aspects, different types of transmission time intervals (TTIs) may be used, other than subframes and/or slots. A slot 310 may include multiple symbols 315, such as 7 symbols or 14 symbols per slot.

The potential control region of a slot 310 may be referred to as a control resource set (CORESET) 320 and may be structured to support an efficient use of resources, such as by flexible configuration or reconfiguration of resources of the CORESET 320 for one or more physical downlink control channels (PDCCHs), one or more physical downlink shared channels (PDSCHs), and/or the like. In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 4, 8, 16, and/or the like.

Each CCE 325 may include a fixed quantity of resource element groups (REGs) 330, shown as 4 REGs 330, or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs), an aggregation level being used, and/or the like. A possible location (e.g., in time and/or frequency) for a PDCCH may be referred to as a PDCCH candidate, and the set of all possible PDCCH locations may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORE-SET 320). A non-interleaved CORESET 320 may have a CCE-to-REG mapping such that all CCEs are mapped to consecutive REG bundles (e.g., in the frequency domain) of the CORESET 320.

As indicated above, FIG. 3 is provided as an example. Other examples may differ from what is described with respect to FIG. 3.

Figure 4:
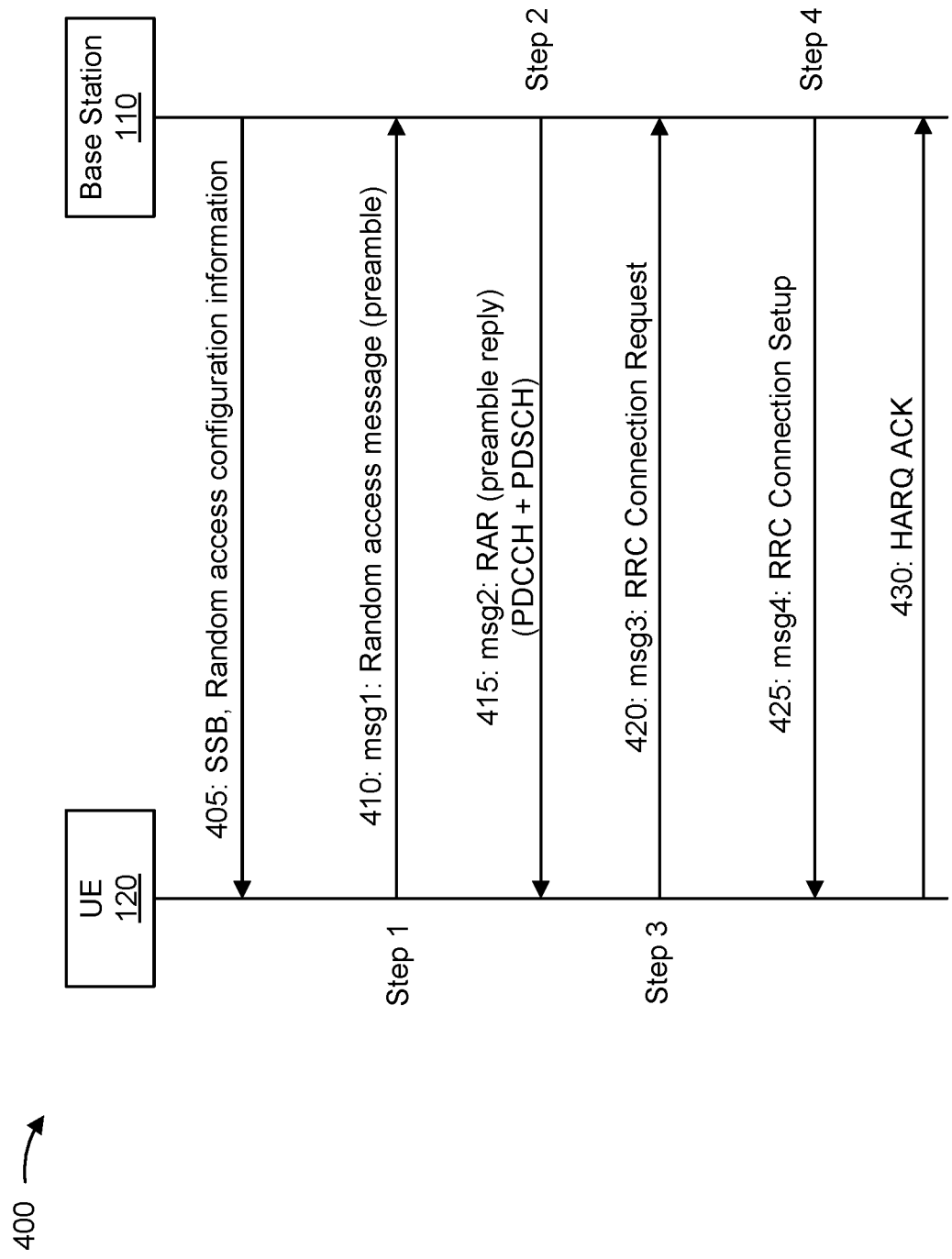
FIG. 4 is a diagram illustrating an example of a four-step random access procedure, in accordance with the present disclosure.

FIG. 4 is a diagram illustrating an example of a four-step random access procedure, in accordance with the present disclosure. As shown in FIG. 4, a base station 110 and a UE 120 may communicate with one another to perform the four-step random access procedure.

As shown by reference number 405, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs) and/or the like) and/or an SSB, such as for contention-based random access. Additionally, or alternatively, the random access configuration information may be transmitted in a radio resource control (RRC) message and/or a physical downlink control channel (PDCCH) order message that triggers a random access channel (RACH) procedure, such as for contention-free random access. The random access configuration information may include one or more parameters to be used in the random access procedure, such as one or more parameters for transmitting a random access message (RAM), one or more parameters for receiving a random access response (RAR), and/or the like.

As shown by reference number 410, the UE 120 may transmit a RAM, which may include a preamble (sometimes referred to as a random access preamble, a physical RACH (PRACH) preamble, a RAM preamble, and/or the like). The message that includes the preamble may be referred to as a message 1, msg1, MSG1, a first message, an initial message, and/or the like in a four-step random access procedure. The random access message may include a random access preamble identifier.

As shown by reference number 415, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may include downlink control information (DCI) (e.g., with a cyclic redundancy check (CRC) scrambled by a random access radio network temporary identifier (RA-RNTI)) that schedules a PDSCH communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a medium access control (MAC) protocol data unit (PDU) of the PDSCH communication.

As shown by reference number 420, the UE 120 may transmit an RRC connection request message. The RRC connection request message may be referred to as message 3, msg3, MSG3, or a third message of a four-step random access procedure. In some aspects, the RRC connection request may include a UE identifier, uplink control information (UCI), a physical uplink shared channel (PUSCH) communication (e.g., an RRC connection request), and/or the like.

As shown by reference number 425, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, contention resolution information, and/or the like. As shown by reference number 430, if the UE 120 successfully receives the RRC connection setup message, the UE 120 may transmit a hybrid automatic repeat request (HARQ) acknowledgment (ACK).

In some cases, the RRC connection setup message may be delayed. For example, in some cases, the UE 120 may need to retransmit the msg3 communication (e.g., the RRC connection request message) to the base station. In particular, if the base station 110 does not receive, or is unable to decode, the msg3 communication, the base station 110 may transmit a PDCCH communication for the msg3 retransmission. The PDCCH communication may include DCI (e.g., with a CRC scrambled by a temporary cell RNTI (TC-RNTI)) that schedules the msg3 retransmission.

Accordingly, the msg3 communication may create a bottleneck in the four-step random access procedure, particularly when multiple retransmissions of the msg3 communication are needed for successful delivery of the RRC connection request message to the base station 110. This may increase a latency associated with the UE 120 obtaining initial access to a network. Moreover, the UE 120 receives separate PDCCHs for scheduling the RAR (e.g., that provides a resources allocation for the initial msg3 communication) and scheduling each msg3 retransmission, thereby causing significant PDCCH overhead.

Some techniques and apparatuses described herein provide for msg3 PUSCH repetition (e.g., repetitions of a PUSCH carrying the msg3), to thereby extend msg3 coverage. In some aspects, a UE may transmit multiple repetitions of an initial transmission of a msg3 communication. Additionally, or alternatively, a UE may transmit multiple repetitions of a retransmission of a msg3 communication. In some aspects, a base station may implicitly indicate a number (e.g., a quantity) of repetitions that the UE 120 is to transmit. For example, the number of repetitions may be implicitly indicated by an aggregation level for a PDCCH that schedules a msg2 communication via PDSCH or a msg3 retransmission. In some aspects, the base station and/or the UE may determine the number of repetitions based at least in part on a channel quality, a transmission power, a location of the UE relative to the base station, a group of msg1 communications, and/or the like, to thereby improve the efficiency of a repetition configuration. That being said, a number of repetitions of a msg3 communication of a four-step RACH procedure can be determined based on information or parameters associated with the four-step RACH procedure. In this way, the performance of msg3 communications may be improved, thereby improving the speed of a four-step random access procedure, reducing PDCCH overhead, reducing initial access latency, and/or the like.

As indicated above, FIG. 4 is provided as an example. Other examples may differ from what is described with regard to FIG. 4.

Figure 5:
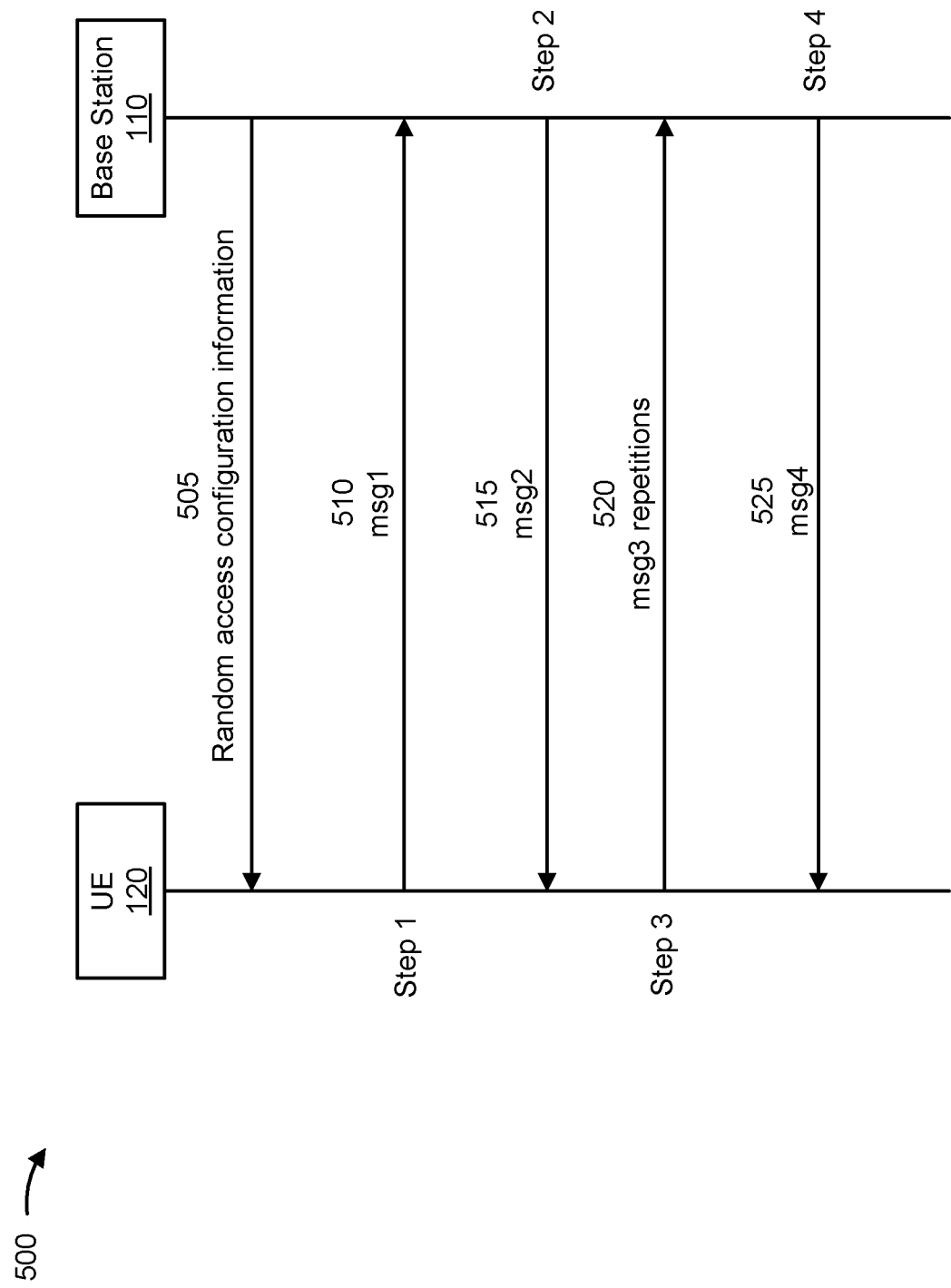
FIG. 5 is a diagram illustrating an example associated with repetition of a message 3 (msg3) communication of a four-step random access channel (RACH) procedure, in accordance with the present disclosure.

FIG. 5 is a diagram illustrating an example 500 associated with repetition of a msg3 communication of a four-step RACH procedure, in accordance with the present disclosure. As shown in FIG. 5, example 500 includes a base station 110 and a UE 120 that may communicate with one another. For example, the base station 110 and the UE 120 may communicate in connection with the UE 120 obtaining initial access to a network associated with the base station 110. In some aspects, the UE 120 and the base station 110 may perform a four-step random access procedure (also referred to herein as a four-step RACH procedure).

As shown by reference number 505, the base station 110 may transmit, and the UE 120 may receive, random access configuration information, as described above. In some aspects, the random access configuration information may identify one or more groups of msg1 communications. For example, one or more PRACH preambles may be associated with a group of msg1 communications. As another example, one or more msg1 formats may be associated with a group of msg1 communications. A msg1 format may be associated with particular time and/or frequency resources for transmitting a msg1 communication. A group of msg1 communications may be associated with a particular number (e.g., quantity) of repetitions for a msg3 communication. For example, a first group of msg1 communications may be associated with a first number of repetitions for a msg3 communication, and a second group of msg1 communications may be associated with a second number of repetitions for a msg3 communication.

In some aspects, the random access configuration information may identify one or more sets of repetitions. A set of repetitions may identify a particular number of repetitions that are to be used for a msg3 communication. For example, a first set of repetitions may be associated with a first number of repetitions for a msg3 communication, and a second set of repetitions may be associated with a second number of repetitions for a msg3 communication. Moreover, a set of repetitions may be associated with a particular transmit power used by the UE 120. For example, a first set of repetitions may be associated with first power values that satisfy a threshold power value, and a second set of repetitions may be associated with second power values that do not satisfy the threshold power value.

In some aspects, the base station 110 may transmit, to the UE 120, one or more different configurations (e.g., other than the random access channel configuration) that identify the one or more groups of msg1 communications and/or the one or more sets of repetitions. In some aspects, the UE 120 may be provisioned with information that identifies the one or more groups of msg1 communications and/or the one or more sets of repetitions.

As shown by reference number 510, the UE 120 may transmit, and the base station 110 may receive, a msg1 communication (e.g., a RAM), as described above. In some aspects, the UE 120 may transmit the msg1 communication using a particular power, and the particular power may be associated with a particular power headroom of the UE 120.

In some aspects, the UE 120 may determine a number (e.g., a quantity) of repetitions that are to be used for a msg3 communication (e.g., based at least in part on a channel quality, a distance between the UE 120 and the base station 110, and/or the like). In this case, the msg1 communication may indicate (e.g., recommend), to the base station 110, the number of repetitions determined by the UE 120. For example, the msg1 communication may indicate the number of repetitions based at least in part on a msg1 communication group to which the msg1 communication belongs. As an example, the msg1 communication may indicate a first number of repetitions for a msg3 communication when the msg1 communication is associated with a first group of msg1 communications, and may indicate a second number of repetitions for a msg3 communication when the msg1 communication is associated with a second group of msg1 communications. In this way, the base station 110 may use the number of repetitions indicated by the UE 120 to determine a more efficient configuration of the number of repetitions for a msg3 communication.

In some aspects, the base station 110 may determine a number of repetitions that are to be used for a msg3 communication. For example, the base station 110 may determine the number of repetitions based at least in part on a measurement (e.g., a quality measurement) of a PRACH carrying the msg1 communication.

As shown by reference number 515, the base station 110 may transmit, and the UE 120 may receive, a msg2 communication (e.g., an RAR), as described above. In some aspects, the UE 120 may receive the msg2 communication in a PDSCH scheduled by DCI carried in a PDCCH. A CRC of the DCI may be scrambled by an RA-RNTI. The msg2 communication may include information that identifies a resource allocation for a msg3 communication.

In some aspects, the PDCCH that carries the DCI may be associated with a particular aggregation level. For example, the base station 110 may transmit (e.g., and the UE 120 may receive) the PDCCH using an aggregation level that is based at least in part on a number of repetitions determined for a msg3 communication. Accordingly, the UE 120 may determine the number of repetitions for a msg3 communication based at least in part on the aggregation level associated with (e.g., used for detecting) the PDCCH that schedules the msg2 communication. That is, the number of repetitions may be implicitly indicated by the aggregation level associated with the PDCCH. In this way, the base station 110 may configure a number of repetitions of a msg3 communication for the UE 120 based at least in part on an aggregation level associated with a PDCCH (e.g., rather than explicitly indicating the number of repetitions in DCI, an RRC configuration, or system information). In some aspects, the UE 120 may transmit the number of repetitions, determined based at least in part on the PDCCH that schedules the msg2 communication, for an initial transmission of a msg3 communication or a retransmission of a msg3 communication.

A series of repeated msg3 communications (e.g., multiple repetitions of a msg3 communication) may include a first transmission of the msg3 communication and one or more subsequent transmissions of the msg3 communication, if any. A series of repeated msg3 communications (e.g., multiple repetitions of a msg3 communication) may be for an initial transmission of a msg3 communication (e.g., a msg3 communication scheduled by a msg2 communication that is scheduled by DCI with a CRC scrambled by an RA-RNTI). For example, multiple repetitions of an initial transmission of a msg3 communication may include a first transmission of the initial transmission and one or more subsequent transmissions of the initial transmission. A series of repeated msg3 communications (e.g., multiple repetitions of a msg3 communication) may be for a retransmission of a msg3 communication (e.g., a msg3 communication scheduled by DCI with a CRC scrambled by a TC-RNTI). For example, multiple repetitions of a retransmission of a msg3 communication may include a first transmission of the retransmission and one or more subsequent transmissions of the retransmission.

In some aspects, the UE 120 may determine a first number of repetitions for a msg3 communication when the aggregation level is a first aggregation level, and determine a second number of repetitions for a msg3 communication when the aggregation level is a second aggregation level. For example, if the aggregation level is less than or equal to a first value (e.g., 4), then this may indicate that repetition for a msg3 communication is not enabled, i.e., the number of repetitions is 1. As another example, if the aggregation level is of a second value (e.g., 8), then this may indicate that a first number (K1) of repetitions for a msg3 communication is to be used (e.g., K1=2). As a further example, if the aggregation level is of a third value (e.g., 16), then this may indicate that a second number (K2) of repetitions for a msg3 communication is to be used (e.g., K2=4).

In some aspects, the UE 120 may determine a first number of repetitions for a msg3 communication when the aggregation level satisfies a first threshold value, and determine a second number of repetitions for a msg3 communication when the aggregation level does not satisfy the first threshold value. For example, if the aggregation level is less than or equal to a threshold value (T) (e.g., T=4), then this may indicate that a first number (K1) of repetitions for a msg3 communication is to be used (e.g., K1=2). As another example, if the aggregation level is greater than the threshold value (T), then this may indicate that a second number (K2) of repetitions for a msg3 communication is to be used (e.g., K2=4). It should be noted that any number of threshold values can be configured. For example, if the aggregation level satisfies a second threshold value greater than the first threshold value, then this may indicate that a third number (K3) of repetitions for a msg3 communication is to be used (e.g., K3=6).

As shown by reference number 520, the UE 120 may transmit, and the base station 110 may receive, multiple repetitions (e.g., PUSCH repetitions) of a msg3 communication (e.g., an initial msg3 communication), as described above (e.g., the UE 120 may repeatedly transmit the msg3 communication). The multiple repetitions of the msg3 communication may use different time resources (e.g., to improve a time diversity of the msg3 communication), may use different frequency resources (e.g., to improve a frequency diversity of the msg3 communication), may use different beams (e.g., to improve a spatial diversity of the msg3 communication), and/or the like. In some aspects, the UE 120 may be configured with information that indicates resources, beams, and/or the like, that the UE 120 is to use for repetitions of the msg3 communication.

In some aspects, the UE 120 may transmit repetitions of the msg3 communication according to a number of repetitions that is determined by the UE 120 based at least in part on the aggregation level of the PDCCH that schedules the msg2 communication, as described above. Additionally, or alternatively, the UE 120 may determine a number of repetitions for the msg3 communication based at least in part on a power used by the UE 120 to transmit the msg1 communication. For example, the UE 120 may select a set of repetitions, from one or more sets of repetitions configured for the UE 120, as described above, based at least in part on the power used by the UE 120. In some aspects, the UE 120 may determine a first number of repetitions for the msg3 communication when a value of the power satisfies a threshold value, e.g., when the value of the power is less than or equal to the threshold value, and determine a second number of repetitions for the msg3 communication when the value of the power does not satisfy the threshold value, e.g., when the value of the power is greater than the threshold value. Accordingly, the UE 120 may transmit repetitions of the msg3 communication according to a number of repetitions that is determined by the UE 120 based at least in part on the power used by the UE 120 for the msg1 communication, as described above.

In some aspects, the UE 120 may not transmit repetitions of the initial msg3 communication. In some aspects, the UE 120 may transmit repetitions of a msg3 communication retransmission in addition to, or as an alternative to, transmitting repetitions of the initial msg3 communication. For example, the UE 120 may transmit repetitions for a msg3 communication retransmission, and a number of the repetitions may be based at least in part on the aggregation level of the PDCCH that schedules the msg2 communication, as described above. Transmitting repetitions of a msg3 communication retransmission may reduce initial access latency even if no repetitions of the initial msg3 communication are transmitted.

In some aspects, the UE 120 may receive a PDCCH carrying DCI that schedules a msg3 communication retransmission. A CRC of the DCI may be scrambled by a TC-RNTI. In some aspects, the PDCCH that carries the DCI may be associated with a particular aggregation level. For example, the base station 110 may transmit (e.g., and the UE 120 may receive) the PDCCH using an aggregation level that is based at least in part on a number of repetitions determined for a msg3 communication retransmission. Accordingly, the UE 120 may determine the number of repetitions for a msg3 communication retransmission based at least in part on the aggregation level associated with (e.g., used for detecting) the PDCCH that schedules the msg3 communication retransmission, as described above. That is, the number of repetitions may be implicitly indicated by the aggregation level associated with the PDCCH. In some aspects, the UE 120 may transmit repetitions of a msg3 communication retransmission, and a number of the repetitions may be determined based at least in part on the PDCCH that schedules the msg3 communication retransmission.

In some aspects, the UE 120 may transmit UCI with the msg3 communication. That is, the msg3 communication may include the UCI, may be multiplexed with the UCI (e.g., the UCI may be multiplexed with the msg3 PUSCH), or may be otherwise combined with the UCI. In some aspects, the UCI may include (e.g., carry) information that enables the base station 110 to determine a number of repetitions to be used for a msg3 communication (e.g., a msg3 initial transmission or a msg3 retransmission). For example, the UCI may indicate (e.g., recommend) the number of repetitions of the msg3 communication (e.g., UCI multiplexed with the msg3 initial transmission may recommend the number of repetitions for a msg3 retransmission). As another example, the UCI may indicate a downlink quality measurement (e.g., a coarse downlink quality measurement), a power headroom report relating to the transmission of the msg1 communication (e.g., a power headroom report after the transmission of the msg1 communication), and/or the like. The base station 110 may determine that a particular downlink quality measurement, or a downlink quality measurement that satisfies a threshold value (e.g., that is less than or equal to the threshold value), is associated with a particular number of repetitions for the msg3 communication. Similarly, the base station 110 may determine that a particular power headroom value, or a power headroom value that satisfies a threshold value, is associated with a particular number of repetitions for the msg3 communication.

In some aspects, the base station 110 may indicate, to the UE 120, a beta factor that is to be used for the UCI (e.g., for resource determination for the UCI). A scaling factor relating channel coding rates between a data channel (e.g., a PUSCH) and UCI may be referred to as a "beta factor." For example, a channel coding rate for UCI may correspond to a channel coding rate for a PUSCH divided by the beta factor (e.g., $$R_{UCI} = \frac{R_{PUSCH}}{\beta}).$$

In some aspects, the random access configuration information may indicate the beta factor. In some aspects, the DCI that schedules the msg2 communication (e.g., the DCI with a CRC scrambled by an RA-RNTI) may indicate the beta factor. For example, the DCI may indicate the beta factor in one or more bits (e.g., reserved bits) of the DCI. In some aspects, the DCI that schedules a msg3 communication retransmission (e.g., the DCI with a CRC scrambled by a TC-RNTI) may indicate the beta factor. For example, the DCI may indicate the beta factor in one or more bits (e.g., reserved bits) of the DCI and/or one or more fields (e.g., reserved fields) of the DCI, such as a new data indicator field (allocated 1 bit), a HARQ process number field (allocated 4 bits), and/or the like. The beta factor may be indicated using two bits.

The UE 120 may determine a number (e.g., a quantity) of resources that are to be used for the UCI based at least in part on the beta factor. For example, the UE 120 may determine the number of resources based at least in part on a payload size of the UCI, a coding rate of the PUSCH multiplexed with the UCI, and the beta factor (e.g., a channel coding rate for the UCI is equal to a channel coding rate for the PUSCH divided by the beta factor). As described above, the beta factor may be dynamically indicated in DCI, or may be semi-statically configured via RRC signaling.

As shown by reference number 525, the base station 110 may transmit, and the UE 120 may receive, a msg4 communication (e.g., an RRC connection setup message). The base station 110 may transmit the msg4 communication in response to receiving one or more of the repetitions of the msg3 communication. Accordingly, the repetitions of the msg3 communication increase a coverage for the msg3 communication, thereby increasing the likelihood that the base station 110 will receive, and be able to decode, the msg3 communication. In this way, the performance of msg3 communications may be improved, thereby improving the speed of a four-step random access procedure, reducing PDCCH overhead, reducing initial access latency, and/or the like.

As indicated above, FIG. 5 is provided as an example. Other examples may differ from what is described with respect to FIG. 5.

Figure 6:
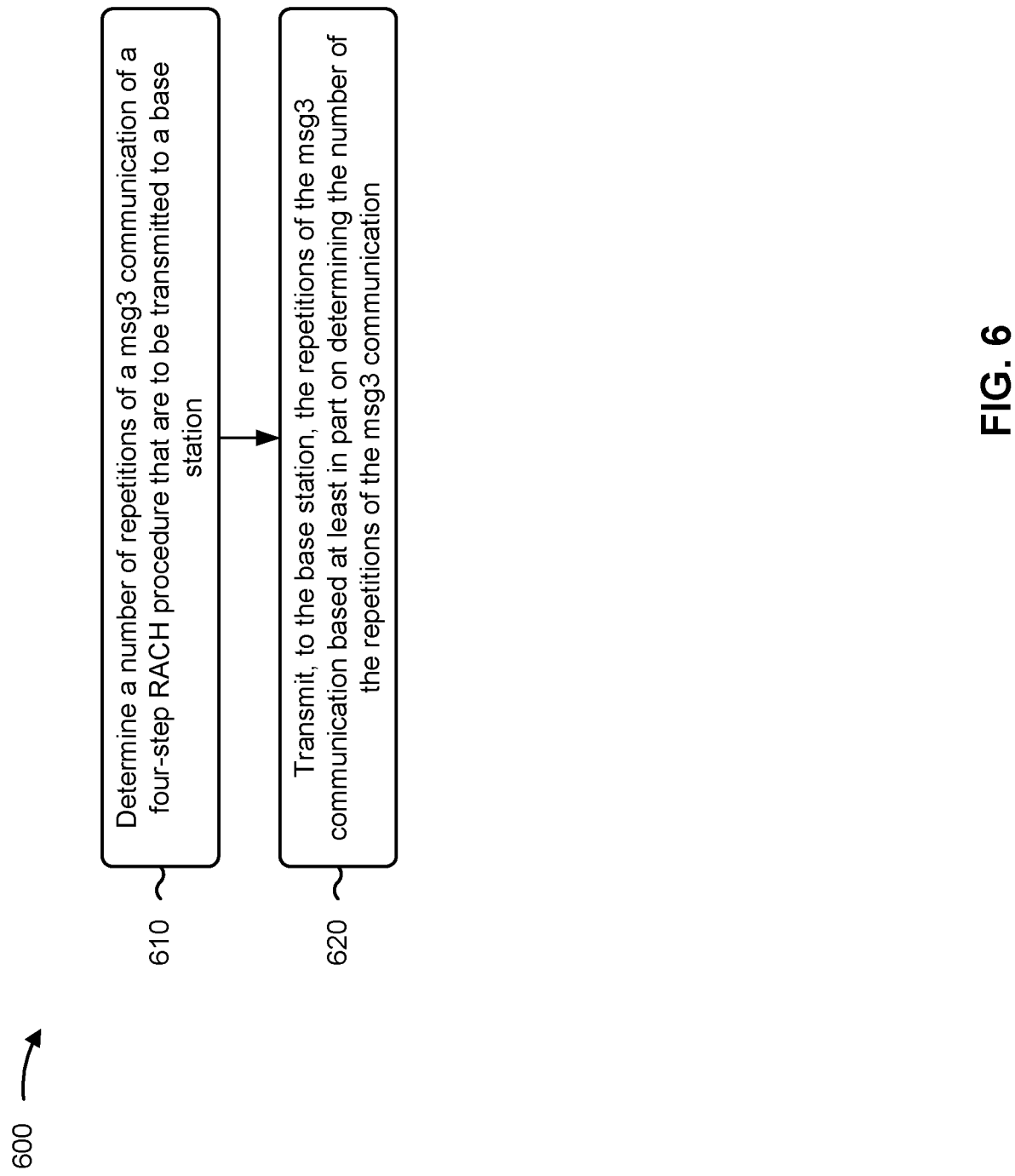
FIGS. 6 and 7 are diagrams illustrating example processes associated with repetition of a msg3 communication of a four-step RACH procedure, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with repetition of a msg3 communication of a four-step RACH procedure.

As shown in FIG. 6, in some aspects, process 600 may include determining a number of repetitions of a msg3 communication of a four-step RACH procedure that are to be transmitted to a base station (block 610). For example, the UE (e.g., using receive processor 258, transmit processor 264, controller/processor 280, memory 282, and/or the like) may determine a number of repetitions of a msg3 communication of a four-step RACH procedure that are to be transmitted to a base station, as described above in connection with FIG. 5.

As further shown in FIG. 6, in some aspects, process 600 may include transmitting, to the base station, the repetitions of the msg3 communication based at least in part on determining the number of the repetitions of the msg3 communication (block 620). For example, the UE (e.g., using controller/processor 280, transmit processor 264, TX MIMO processor 266, MOD 254, antenna 252, and/or the like) may transmit, to the base station, the repetitions of the msg3 communication based at least in part on determining the number of the repetitions of the msg3 communication, as described above in connection with FIG. 5.

Process 600 may include additional aspects, such as any single aspect or any combination of aspects described below and/or in connection with one or more other processes described elsewhere herein.

In a first aspect, the number of the repetitions of the msg3 communication is determined based at least in part on an aggregation level associated with a PDCCH.

In a second aspect, alone or in combination with the first aspect, the PDCCH carries downlink control information that schedules a msg2 communication of the four-step RACH procedure.

In a third aspect, alone or in combination with one or more of the first and second aspects, the msg3 communication is an initial transmission or a retransmission.

In a fourth aspect, alone or in combination with one or more of the first through third aspects, the PDCCH carries downlink control information that schedules a msg3 communication retransmission.

In a fifth aspect, alone or in combination with one or more of the first through fourth aspects, the msg3 communication is a retransmission.

In a sixth aspect, alone or in combination with one or more of the first through fifth aspects, the number of the repetitions of the msg3 communication is determined to be a first number of the repetitions of the msg3 communication when the aggregation level is a first aggregation level, and the number of the repetitions of the msg3 communication is determined to be a second number of the repetitions of the msg3 communication when the aggregation level is a second aggregation level.

In a seventh aspect, alone or in combination with one or more of the first through sixth aspects, the number of the repetitions of the msg3 communication is determined to be a first number of the repetitions of the msg3 communication when the aggregation level satisfies a threshold value, e.g., when the aggregation level is less than or equal to the threshold value, and the number of the repetitions of the msg3 communication is determined to be a second number of the repetitions of the msg3 communication when the aggregation level does not satisfy the threshold value.

In an eighth aspect, alone or in combination with one or more of the first through seventh aspects, the number of the repetitions of the msg3 communication is based at least in part on a measurement, taken by the base station, of a physical RACH that carries a msg1 communication of the four-step RACH procedure.

In a ninth aspect, alone or in combination with one or more of the first through eighth aspects, process 600 includes transmitting a msg1 communication, of the four-step RACH procedure, that indicates the number of the repetitions of the msg3 communication.

In a tenth aspect, alone or in combination with one or more of the first through ninth aspects, the msg1 communication indicates a first number of the repetitions of the msg3 communication when the msg1 communication is associated with a first group of msg1 communications, and indicates a second number of the repetitions of the msg3 communication when the msg1 communication is associated with a second group of msg1 communications.

In an eleventh aspect, alone or in combination with one or more of the first through tenth aspects, the number of the repetitions of the msg3 communication is based at least in part on a power used by the UE to transmit a msg1 communication of the four-step RACH procedure.

In a twelfth aspect, alone or in combination with one or more of the first through eleventh aspects, the number of the repetitions of the msg3 communication is a first number of the repetitions of the msg3 communication when a value of the power satisfies a threshold value, e.g., when the value of the power is less than or equal to the threshold value, and the number of the repetitions of the msg3 communication is a second number of the repetitions of the msg3 communication when the value of the power does not satisfy the threshold value.

In a thirteenth aspect, alone or in combination with one or more of the first through twelfth aspects, UCI is multiplexed with the msg3 communication, the UCI indicating at least one of: the number of the repetitions of the msg3 communication, a downlink quality measurement, or a power headroom report.

In a fourteenth aspect, alone or in combination with one or more of the first through thirteenth aspects, process 600 includes receiving an indication of a beta factor that is to be used for UCI resource determination.

In a fifteenth aspect, alone or in combination with one or more of the first through fourteenth aspects, the indication is received in at least one of: one or more bits of downlink control information that schedules a msg2 communication of the four-step RACH procedure, one or more bits or one or more fields of downlink control information that schedules a msg3 communication retransmission, or a system information message associated with RACH configuration.

In a sixteenth aspect, alone or in combination with one or more of the first through fifteenth aspects, the repetitions of the msg3 communication are repetitions of a PUSCH carrying a msg3.

In a seventeenth aspect, alone or in combination with one or more of the first through sixteenth aspects, the number of the repetitions of the msg3 communication is determined based at least in part on a power used by the UE to transmit a msg1 communication of the four-step RACH procedure.

In an eighteenth aspect, alone or in combination with one or more of the first through seventeenth aspects, the number of the repetitions of the msg3 communication is determined to be a first number of the repetitions of the msg3 communication when a value of the power satisfies a threshold value, e.g., when the value of the power is less than or equal to the threshold value, and the number of the repetitions of the msg3 communication is determined to be a second number of the repetitions of the msg3 communication when the value of the power does not satisfy the threshold value.

In a nineteenth aspect, alone or in combination with one or more of the first through eighteenth aspects, the msg3 communication is multiplexed in a physical uplink shared channel with uplink control information (UCI) that indicates at least one of the number of the repetitions of the msg3 communication, a downlink quality measurement, or a power headroom report for a message 1 communication of the four-step RACH procedure.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
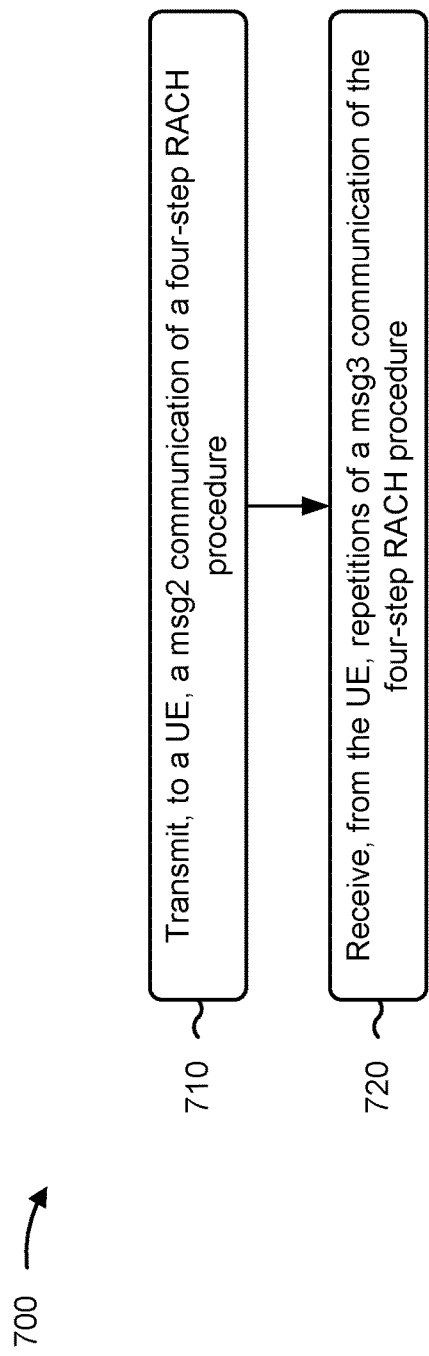

FIG. 7 is a diagram illustrating an example process 700 performed, for example, by a base station, in accordance with the present disclosure. Example process 700 is an example where the base station (e.g., base station 110 and/or the like) performs operations associated with repetition of a msg3 communication of a four-step RACH procedure.

As shown in FIG. 7, in some aspects, process 700 may include transmitting, to a UE, a msg2 communication of a four-step RACH procedure (block 710). For example, the base station (e.g., using transmit processor 220, receive processor 238, controller/processor 240, memory 242, and/or the like) may transmit, to a UE, a msg2 communication of a four-step RACH procedure, as described above in connection with FIG. 5.

As further shown in FIG. 7, in some aspects, process 700 may include receiving, from the UE, repetitions of a msg3 communication of the four-step RACH procedure (block 720). For example, the base station (e.g., using antenna 234, DEMOD 232, MIMO detector 236, receive processor 238, controller/processor 240, and/or the like) may receive, from the UE, repetitions of a msg3 communication of the four-step RACH procedure, as described above in connection with FIG. 5.

In some aspects, process 700 may include determining a number of repetitions of a msg3 communication of a four-step RACH procedure that are to be transmitted by a UE. For example, the base station (e.g., using transmit processor 220, receive processor 238, controller/processor 240, memory 242, and/or the like) may determine a number of repetitions of a msg3 communication of a four-step RACH procedure that are to be transmitted by a UE, as described above in connection with FIG. 5. In some aspects, process 700 may include receiving, from the UE, the repetitions of the msg3 communication based at least in part on determining the number of repetitions of the msg3 communication. For example, the base station (e.g., using antenna 234, DEMOD 232, MIMO detector 236, receive processor 238, controller/processor 240, and/or the like) may receive, from the UE, the repetitions of the msg3 communication based at least in part on determining the number of repetitions of the msg3 communication, as described above in connection with FIG. 5.

Process 700 may include additional aspects, such as any single aspect or any combination of aspects described below and/or in connection with one or more other processes described elsewhere herein.

In a first aspect, process 700 includes transmitting a PDCCH using an aggregation level that is based at least in part on a number of the repetitions for the msg3 communication.

In a second aspect, alone or in combination with the first aspect, the PDCCH carries downlink control information that schedules the msg2 communication.

In a third aspect, alone or in combination with one or more of the first and second aspects, the msg3 communication is an initial transmission or a retransmission.

In a fourth aspect, alone or in combination with one or more of the first through third aspects, the PDCCH carries downlink control information that schedules a msg3 communication retransmission.

In a fifth aspect, alone or in combination with one or more of the first through fourth aspects, the msg3 communication is a retransmission.

In a sixth aspect, alone or in combination with one or more of the first through fifth aspects, a number of the repetitions of the msg3 communication is a first number of the repetitions of the msg3 communication when the aggregation level is a first aggregation level, and the number of the repetitions of the msg3 communication is a second number of the repetitions of the msg3 communication when the aggregation level is a second aggregation level.

In a seventh aspect, alone or in combination with one or more of the first through sixth aspects, a number of the repetitions of the msg3 communication is a first number of the repetitions of the msg3 communication when the aggregation level satisfies a threshold value, e.g., when the aggregation level is less than or equal to the threshold value, and a number of the repetitions of the msg3 communication is a second number of the repetitions of the msg3 communication when the aggregation level does not satisfy the threshold value.

In an eighth aspect, alone or in combination with one or more of the first through seventh aspects, a number of the repetitions of the msg3 communication is based at least in part on a measurement, taken by the base station, of a physical RACH that carries a msg1 communication of the four-step RACH procedure.

In a ninth aspect, alone or in combination with one or more of the first through eighth aspects, process 700 includes receiving a msg1 communication, of the four-step RACH procedure, that indicates a number of the repetitions of the msg3 communication.

In a tenth aspect, alone or in combination with one or more of the first through ninth aspects, the msg1 communication indicates a first number of the repetitions of the msg3 communication when the msg1 communication is associated with a first group of msg1 communications, and indicates a second number of the repetitions of the msg3 communication when the msg1 communication is associated with a second group of msg1 communications.

In an eleventh aspect, alone or in combination with one or more of the first through tenth aspects, a number of the repetitions of the msg3 communication is based at least in part on a power used by the UE to transmit a msg1 communication of the four-step RACH procedure.

In a twelfth aspect, alone or in combination with one or more of the first through eleventh aspects, the number of the repetitions of the msg3 communication is a first number of the repetitions of the msg3 communication when a value of the power satisfies a threshold value, e.g., when the value of the power is less than or equal to the threshold value, and the number of the repetitions of the msg3 communication is a second number of the repetitions of the msg3 communication when a value of the power does not satisfy the threshold value.

In a thirteenth aspect, alone or in combination with one or more of the first through twelfth aspects, UCI is multiplexed with the msg3 communication, the UCI indicating at least one of: a number of the repetitions of the msg3 communication, a downlink quality measurement, or a power headroom report.

In a fourteenth aspect, alone or in combination with one or more of the first through thirteenth aspects, process 700 includes transmitting an indication of a beta factor that is to be used for UCI resource determination.

In a fifteenth aspect, alone or in combination with one or more of the first through fourteenth aspects, the indication is transmitted in at least one of: one or more bits of downlink control information that schedules the msg2 communication, one or more bits or one or more fields of downlink control information that schedules a msg3 communication retransmission, or a system information message associated with RACH configuration.

In a sixteenth aspect, alone or in combination with one or more of the first through fifteenth aspects, the repetitions of the msg3 communication are repetitions of a PUSCH carrying a msg3.

In a seventeenth aspect, alone or in combination with one or more of the first through sixteenth aspects, the number of the repetitions of the msg3 communication is determined based at least in part on an aggregation level associated with a PDCCH.

In an eighteenth aspect, alone or in combination with one or more of the first through seventeenth aspects, the number of repetitions of the msg3 communication is determined to be a first number of the repetitions of the msg3 communication when the aggregation level is a first aggregation level, and the number of the repetitions of the msg3 communication is determined to be a second number of the repetitions of the msg3 communication when the aggregation level is a second aggregation level.

In a nineteenth aspect, alone or in combination with one or more of the first through eighteenth aspects, the number of the repetitions of the msg3 communication is determined to be a first number of the repetitions of the msg3 communication when the aggregation level satisfies a threshold value, e.g., when the aggregation level is smaller than or equal to the threshold value, and the number of the repetitions of the msg3 communication is determined to be a second number of the repetitions of the msg3 communication when the aggregation level does not satisfy the threshold value.

In a twentieth aspect, alone or in combination with one or more of the first through nineteenth aspects, the number of the repetitions of the msg3 communication is determined based at least in part on a power used by the UE to transmit a msg1 communication of the four-step RACH procedure.

In a twenty-first aspect, alone or in combination with one or more of the first through twentieth aspects, the number of the repetitions of the msg3 communication is determined to be a first number of the repetitions of the msg3 communication when a value of the power satisfies a threshold value, e.g., when the value of the power is smaller than or equal to the threshold value, and the number of the repetitions of the msg3 communication is determined to be a second number of the repetitions of the msg3 communication when a value of the power does not satisfy the threshold value.

In a twenty-second aspect, alone or in combination with one or more of the first through twenty-first aspects, the msg3 communication is multiplexed in a PUSCH with UCI that indicates at least one of: the number of the repetitions of the msg3 communication, a downlink quality measurement, or a power headroom report for a msg1 communication of the four-step RACH procedure.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment (UE), comprising: determining a number of repetitions of a message 3 (msg3) communication of a four-step random access channel (RACH) procedure that are to be transmitted to a base station; and transmitting, to the base station, the repetitions of the msg3 communication based at least in part on determining the number of the repetitions of the msg3 communication.

Aspect 2: The method of Aspect 1, wherein the number of the repetitions of the msg3 communication is determined based at least in part on an aggregation level associated with a physical downlink control channel (PDCCH).

Aspect 3: The method of Aspect 2, wherein the PDCCH carries downlink control information (DCI) that schedules a message 2 communication of the four-step RACH procedure.

Aspect 4: The method of Aspect 3, wherein the msg3 communication is an initial transmission or a retransmission.

Aspect 5: The method of Aspect 2, wherein the PDCCH carries downlink control information (DCI) that schedules the msg3 communication.

Aspect 6: The method of Aspect 5, wherein the msg3 communication is a retransmission.

Aspect 7: The method of any of Aspects 2-6, wherein the number of the repetitions of the msg3 communication is determined to be a first number of the repetitions of the msg3 communication when the aggregation level is a first aggregation level, and the number of the repetitions of the msg3 communication is determined to be a second number of the repetitions of the msg3 communication when the aggregation level is a second aggregation level.

Aspect 8: The method of any of Aspects 2-6, wherein the number of the repetitions of the msg3 communication is determined to be a first number of the repetitions of the msg3 communication when the aggregation level satisfies a threshold value, and the number of the repetitions of the msg3 communication is determined to be a second number of the repetitions of the msg3 communication when the aggregation level does not satisfy the threshold value.

Aspect 9: The method of any of Aspects 1-8, wherein the number of the repetitions of the msg3 communication is based at least in part on a measurement of a physical RACH that carries a message 1 communication of the four-step RACH procedure.

Aspect 10: The method of any of Aspects 1-9, further comprising: transmitting a message 1 (msg1) communication, of the four-step RACH procedure, that indicates the number of the repetitions of the msg3 communication.

Aspect 11: The method of Aspect 10, wherein the msg1 communication indicates a first number of the repetitions of the msg3 communication when the msg1 communication is associated with a first group of msg1 communications, and indicates a second number of the repetitions of the msg3 communication when the msg1 communication is associated with a second group of msg1 communications.

Aspect 12: The method of any of Aspects 1-8, wherein the number of the repetitions of the msg3 communication is based at least in part on a power used by the UE to transmit a message 1 communication of the four-step RACH procedure.

Aspect 13: The method of Aspect 12, wherein the number of the repetitions of the msg3 communication is a first number of the repetitions of the msg3 communication when a value of the power satisfies a threshold value, and the number of the repetitions of the msg3 communication is a second number of the repetitions of the msg3 communication when the value of the power does not satisfy the threshold value.

Aspect 14: The method of Aspect 1, wherein uplink control information (UCI) is multiplexed with the msg3 communication, the UCI indicating at least one of: the number of the repetitions of the msg3 communication, a downlink quality measurement, or a power headroom report.

Aspect 15: The method of any of Aspects 1 or 14, further comprising: receiving an indication of a beta factor that is to be used for uplink control information (UCI) resource determination.

Aspect 16: The method of Aspect 15, wherein the indication is received in at least one of: one or more bits of downlink control information (DCI) that schedules a message 2 communication of the four-step RACH procedure, one or more bits or one or more fields of downlink control information (DCI) that schedules the msg3 communication, or a system information message associated with RACH configuration.

Aspect 17: The method of any of Aspects 1-16, wherein the repetitions of the msg3 communication are repetitions of a physical uplink shared channel (PUSCH) carrying a msg3.

Aspect 18: A method of wireless communication performed by a base station, comprising: transmitting, to a user equipment (UE), a message 2 (msg2) communication of a four-step random access channel (RACH) procedure; and receiving, from the UE, repetitions of a message 3 (msg3) communication of the four-step RACH procedure.

Aspect 19: The method of Aspect 18, further comprising: transmitting a physical downlink control channel (PDCCH) using an aggregation level that is based at least in part on a number of the repetitions for the msg3 communication.

Aspect 20: The method of Aspect 19, wherein the PDCCH carries downlink control information (DCI) that schedules the msg2 communication.

Aspect 21: The method of Aspect 20, wherein the msg3 communication is an initial transmission or a retransmission.

Aspect 22: The method of Aspect 19, wherein the PDCCH carries downlink control information (DCI) that schedules the msg3 communication.

Aspect 23: The method of Aspect 22, wherein the msg3 communication is a retransmission.

Aspect 24: The method of any of Aspects 19-23, wherein a number of the repetitions of the msg3 communication is a first number of the repetitions of the msg3 communication when the aggregation level is a first aggregation level, and the number of the repetitions of the msg3 communication is a second number of the repetitions of the msg3 communication when the aggregation level is a second aggregation level.

Aspect 25: The method of any of Aspects 19-23, wherein a number of the repetitions of the msg3 communication is a first number of the repetitions of the msg3 communication when the aggregation level satisfies a threshold value, and the number of the repetitions of the msg3 communication is a second number of the repetitions of the msg3 communication when the aggregation level does not satisfy the threshold value.

Aspect 26: The method of any of Aspects 18-25, wherein a number of the repetitions of the msg3 communication is based at least in part on a measurement, taken by the base station, of a physical RACH that carries a message 1 communication of the four-step RACH procedure.

Aspect 27: The method of any of Aspects 18-26, further comprising: receiving a message 1 (msg1) communication, of the four-step RACH procedure, that indicates a number of the repetitions of the msg3 communication.

Aspect 28: The method of Aspect 27, wherein the msg1 communication indicates a first number of the repetitions of the msg3 communication when the msg1 communication is associated with a first group of msg1 communications, and indicates a second number of the repetitions of the msg3 communication when the msg1 communication is associated with a second group of msg1 communications.

Aspect 29: The method of any of Aspects 18-25, wherein a number of the repetitions of the msg3 communication is based at least in part on a power used by the UE to transmit a message 1 communication of the four-step RACH procedure.

Aspect 30: The method of Aspect 29, wherein a number of the repetitions of the msg3 communication is a first number of the repetitions of the msg3 communication when a value of the power satisfies a threshold value, and the number of the repetitions of the msg3 communication is a second number of the repetitions of the msg3 communication when a value of the power does not satisfy the threshold value.

Aspect 31: The method of Aspect 18, wherein uplink control information (UCI) is multiplexed with the msg3 communication, the UCI indicating at least one of: a number of the repetitions of the msg3 communication, a downlink quality measurement, or a power headroom report.

Aspect 32: The method of any of Aspects 18 or 31, further comprising: transmitting an indication of a beta factor that is to be used for uplink control information (UCI) resource determination.

Aspect 33: The method of Aspect 32, wherein the indication is transmitted in at least one of: one or more bits of downlink control information (DCI) that schedules the msg2 communication, one or more bits or one or more fields of downlink control information (DCI) that schedules the msg3 communication, or a system information message associated with RACH configuration.

Aspect 34: The method of any of Aspects 18-33, wherein the repetitions of the msg3 communication are repetitions of a physical uplink shared channel (PUSCH) carrying a msg3.

Aspect 35: An apparatus for wireless communication at a user equipment, comprising a processor; memory coupled with the processor; and instructions stored in the memory and executable by the processor to cause the apparatus to perform the method of one or more of Aspects 1-17.

Aspect 36: A user equipment for wireless communication, comprising a memory and one or more processors coupled to the memory, the memory and the one or more processors configured to perform the method of one or more of Aspects 1-17.

Aspect 37: An apparatus for wireless communication at a user equipment, comprising at least one means for performing the method of one or more of Aspects 1-17.

Aspect 38: A non-transitory computer-readable medium storing code for wireless communication, the code comprising instructions executable by a processor to perform the method of one or more of Aspects 1-17.

Aspect 39: A non-transitory computer-readable medium storing a set of instructions for wireless communication, the set of instructions comprising one or more instructions that, when executed by one or more processors of a user equipment, cause the user equipment to perform the method of one or more of Aspects 1-17.

Aspect 40: An apparatus for wireless communication at a base station, comprising a processor; memory coupled with the processor; and instructions stored in the memory and executable by the processor to cause the apparatus to perform the method of one or more of Aspects 18-34.

Aspect 41: A base station for wireless communication, comprising a memory and one or more processors coupled to the memory, the memory and the one or more processors configured to perform the method of one or more of Aspects 18-34.

Aspect 42: An apparatus for wireless communication at a base station, comprising at least one means for performing the method of one or more of Aspects 18-34.

Aspect 43: A non-transitory computer-readable medium storing code for wireless communication, the code comprising instructions executable by a processor to perform the method of one or more of Aspects 18-34.

Aspect 44: A non-transitory computer-readable medium storing a set of instructions for wireless communication, the set of instructions comprising one or more instructions that, when executed by one or more processors of a base station, cause the base station to perform the method of one or more of Aspects 18-34.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    determining, based at least in part on a value of an aggregation level associated with a physical downlink control channel (PDCCH), a number of repetitions of a message 3 (msg3) communication of a four-step random access channel (RACH) procedure that are to be transmitted to a base station; and
    transmitting, to the base station, the number of the repetitions of the msg3 communication based at least in part on determining the number of the repetitions of the msg3 communication.

2. The method of claim 1, wherein the PDCCH carries downlink control information (DCI) that schedules a message 2 communication of the four-step RACH procedure.

3. The method of claim 2, wherein the msg3 communication is an initial transmission or a retransmission.

4. The method of claim 1, wherein the PDCCH carries downlink control information (DCI) that schedules the msg3 communication.

5. The method of claim 4, wherein the msg3 communication is a retransmission.

6. The method of claim 1, wherein the number of the repetitions of the msg3 communication is determined to be a first number of the repetitions of the msg3 communication when the value of the aggregation level is a first aggregation level, and the number of the repetitions of the msg3 communication is determined to be a second number of the repetitions of the msg3 communication when the aggregation level is a second aggregation level.

7. The method of claim 1, wherein the number of the repetitions of the msg3 communication is determined to be a first number of the repetitions of the msg3 communication when the value of the aggregation level satisfies a threshold value, and the number of the repetitions of the msg3 communication is determined to be a second number of the repetitions of the msg3 communication when the aggregation level does not satisfy the threshold value.

8. The method of claim 1, wherein the number of the repetitions of the msg3 communication is based at least in part on a measurement of a physical RACH that carries a message 1 communication of the four-step RACH procedure.

9. The method of claim 1, further comprising:
    transmitting a message 1 (msg1) communication, of the four-step RACH procedure, that indicates the number of the repetitions of the msg3 communication.

10. The method of claim 1, wherein uplink control information (UCI) is multiplexed with the msg3 communication, the UCI indicating at least one of:
    the number of the repetitions of the msg3 communication,
    a downlink quality measurement, or
    a power headroom report.

11. The method of claim 1, further comprising:
    receiving an indication of a beta factor that is to be used for uplink control information (UCI) resource determination.

12. The method of claim 11, wherein the indication is received in at least one of:
    one or more bits of downlink control information (DCI) that schedules a message 2 communication of the four-step RACH procedure,
    one or more bits or one or more fields of downlink control information (DCI) that schedules the msg3 communication, or
    a system information message associated with RACH configuration.

13. The method of claim 1, wherein the number of the repetitions of the msg3 communication are repetitions of a physical uplink shared channel (PUSCH) carrying a msg3.

14. A method of wireless communication performed by a base station, comprising:
    transmitting, to a user equipment (UE) and in a physical downlink control channel (PDCCH), a message 2 (msg2) communication of a four-step random access channel (RACH) procedure; and
    receiving, from the UE, repetitions of a message 3 (msg3) communication of the four-step RACH procedure, wherein a number of the repetitions are based at least in part on a value of an aggregation level associated with the PDCCH.

15. The method of claim 14, wherein the PDCCH carries downlink control information (DCI) that schedules the msg2 communication.

16. The method of claim 15, wherein the msg3 communication is an initial transmission or a retransmission.

17. The method of claim 14, wherein the PDCCH carries downlink control information (DCI) that schedules the msg3 communication.

18. The method of claim 17, wherein the msg3 communication is a retransmission.

19. The method of claim 14, wherein the number of the repetitions of the msg3 communication is a first number of the repetitions of the msg3 communication when the value of the aggregation level is a first aggregation level, and the number of the repetitions of the msg3 communication is a second number of the repetitions of the msg3 communication when the aggregation level is a second aggregation level.

20. The method of claim 14, wherein flail the number of the repetitions of the msg3 communication is a first number of the repetitions of the msg3 communication when the value of the aggregation level satisfies a threshold value, and the number of the repetitions of the msg3 communication is a second number of the repetitions of the msg3 communication when the aggregation level does not satisfy the threshold value.

21. The method of claim 14, wherein the number of the repetitions of the msg3 communication is based at least in part on a measurement, taken by the base station, of a physical RACH that carries a message 1 communication of the four-step RACH procedure.

22. The method of claim 14, further comprising:
receiving a message 1 (msg1) communication, of the four-step RACH procedure, that indicates a number of the repetitions of the msg3 communication.

23. The method of claim 14, wherein uplink control information (UCI) is multiplexed with the msg3 communication, the UCI indicating at least one of:
a number of the repetitions of the msg3 communication,
a downlink quality measurement, or
a power headroom report.

24. The method of claim 14, further comprising:
transmitting an indication of a beta factor that is to be used for uplink control information (UCI) resource determination.

25. The method of claim 24, wherein the indication is transmitted in at least one of:
one or more bits of downlink control information (DCI) that schedules the msg2 communication,
one or more bits or one or more fields of downlink control information (DCI) that schedules the msg3 communication, or
a system information message associated with RACH configuration.

26. The method of claim 14, wherein the repetitions of the msg3 communication are repetitions of a physical uplink shared channel (PUSCH) carrying a msg3.

27. A user equipment (UE) for wireless communication, comprising:
a memory; and
one or more processors coupled to the memory, the one or more processors configured to:
determine, based at least in part on a value of an aggregation level associated with a physical downlink control channel (PDCCH), a number of repetitions of a message 3 (msg3) communication of a four-step random access channel (RACH) procedure that are to be transmitted to a base station; and
transmit, to the base station, the number of the repetitions of the msg3 communication based at least in part on determining the number of the repetitions of the msg3 communication.

28. The UE of claim 27, wherein the PDCCH carries downlink control information that schedules a message 2 communication of the four-step RACH procedure.

29. The UE of claim 28, wherein the msg3 communication is an initial transmission or a retransmission.

30. The UE of claim 27, wherein the PDCCH carries downlink control information that schedules the msg3 communication.

31. The UE of claim 30, wherein the msg3 communication is a retransmission.

32. The UE of claim 27, wherein the number of the repetitions of the msg3 communication is determined to be a first number of the repetitions of the msg3 communication when the value of the aggregation level is a first aggregation level, and the number of the repetitions of the msg3 communication is determined to be a second number of the repetitions of the msg3 communication when the aggregation level is a second aggregation level.

33. The UE of claim 27, wherein the number of the repetitions of the msg3 communication is determined to be a first number of the repetitions of the msg3 communication when the value of the aggregation level satisfies a threshold value, and the number of the repetitions of the msg3 communication is determined to be a second number of the repetitions of the msg3 communication when the aggregation level does not satisfy the threshold value.

34. The UE of claim 27, wherein the number of the repetitions of the msg3 communication is based at least in part on a measurement of a physical RACH that carries a message 1 communication of the four-step RACH procedure.

35. The UE of claim 27, wherein the one or more processors are further configured to:
transmit a message 1 (msg1) communication, of the four-step RACH procedure, that indicates the number of the repetitions of the msg3 communication.

36. The UE of claim 27, wherein uplink control information (UCI) is multiplexed with the msg3 communication, the UCI indicating at least one of:
the number of the repetitions of the msg3 communication,
a downlink quality measurement, or
a power headroom report.

37. The UE of claim 27, wherein the one or more processors are further configured to:
receive an indication of a beta factor that is to be used for uplink control information (UCI) resource determination.

38. The UE of claim 37, wherein the indication is received in at least one of:
one or more bits of downlink control information (DCI) that schedules a message 2 communication of the four-step RACH procedure,
one or more bits or one or more fields of downlink control information (DCI) that schedules the msg3 communication, or
a system information message associated with RACH configuration.

39. The UE of claim 27, wherein the repetitions of the msg3 communication are repetitions of a physical uplink shared channel (PUSCH) carrying a msg3.

40. A base station for wireless communication, comprising:
a memory; and
one or more processors coupled to the memory, the one or more processors configured to:
transmit, to a user equipment (UE) and in a physical downlink control channel (PDCCH), a message 2 (msg2) communication of a four-step random access channel (RACH) procedure; and
receive, from the UE, repetitions of a message 3 (msg3) communication of the four-step RACH procedure, wherein a number of the repetitions are based at least in part on a value of an aggregation level associated with the PDCCH.

41. The base station of claim 40, wherein the PDCCH carries downlink control information (DCI) that schedules the msg2 communication.

42. The base station of claim 41, wherein the msg3 communication is an initial transmission or a retransmission.

43. The base station of claim 40, wherein the PDCCH carries downlink control information (DCI) that schedules the msg3 communication.

44. The base station of claim 43, wherein the msg3 communication is a retransmission.

45. The base station of claim 40, wherein the number of the repetitions of the msg3 communication is a first number of the repetitions of the msg3 communication when the value of the aggregation level is a first aggregation level, and the number of the repetitions of the msg3 communication is a second number of the repetitions of the msg3 communication when the aggregation level is a second aggregation level.

46. The base station of claim 40, wherein the number of the repetitions of the msg3 communication is a first number of the repetitions of the msg3 communication when the value of the aggregation level satisfies a threshold value, and the number of the repetitions of the msg3 communication is a second number of the repetitions of the msg3 communication when the aggregation level does not satisfy the threshold value.

47. The base station of claim 40, wherein a number of the repetitions of the msg3 communication is based at least in part on a measurement, taken by the base station, of a physical RACH that carries a message 1 communication of the four-step RACH procedure.

48. The base station of claim 40, wherein the one or more processors are further configured to:
receive a message 1 (msg1) communication, of the four-step RACH procedure, that indicates a number of the repetitions of the msg3 communication.

49. The base station of claim 40, wherein uplink control information (UCI) is multiplexed with the msg3 communication, the UCI indicating at least one of:
a number of the repetitions of the msg3 communication,
a downlink quality measurement, or
a power headroom report.

50. The base station of claim 40, wherein the one or more processors are further configured to:
transmit an indication of a beta factor that is to be used for uplink control information (UCI) resource determination.

51. The base station of claim 50, wherein the indication is transmitted in at least one of:
one or more bits of downlink control information (DCI) that schedules the msg2 communication,
one or more bits or one or more fields of downlink control information (DCI) that schedules the msg3 communication, or
a system information message associated with RACH configuration.

52. The base station of claim 40, wherein the repetitions of the msg3 communication are repetitions of a physical uplink shared channel (PUSCH) carrying a msg3.

53. An apparatus for wireless communication at a user equipment, comprising:
means for determining, based at least in part on a value of an aggregation level associated with a physical downlink control channel (PDCCH), a number of repetitions of a message 3 (msg3) communication of a four-step random access channel (RACH) procedure that are to be transmitted to a base station; and
means for transmitting, to the base station, the number of the repetitions of the msg3 communication based at least in part on determining the number of the repetitions of the msg3 communication.

54. The apparatus of claim 53, wherein the PDCCH carries downlink control information (DCI) that schedules a message 2 communication of the four-step RACH procedure.

55. The apparatus of claim 54, wherein the msg3 communication is an initial transmission or a retransmission.

56. The apparatus of claim 53, wherein the PDCCH carries downlink control information (DCI) that schedules the msg3 communication.

57. The apparatus of claim 56, wherein the msg3 communication is a retransmission.

58. The apparatus of claim 53, wherein the number of the repetitions of the msg3 communication is determined to be a first number of the repetitions of the msg3 communication when the aggregation level is a first aggregation level, and the number of the repetitions of the msg3 communication is determined to be a second number of the repetitions of the msg3 communication when the aggregation level is a second aggregation level.

59. The apparatus of claim 53, wherein the number of the repetitions of the msg3 communication is determined to be a first number of the repetitions of the msg3 communication when the aggregation level satisfies a threshold value, and the number of the repetitions of the msg3 communication is determined to be a second number of the repetitions of the msg3 communication when the aggregation level does not satisfy the threshold value.

60. The apparatus of claim 53, wherein uplink control information (UCI) is multiplexed with the msg3 communication, the UCI indicating at least one of:
the number of the repetitions of the msg3 communication,
a downlink quality measurement, or
a power headroom report.

61. The apparatus of claim 53, further comprising:
means for receiving an indication of a beta factor that is to be used for uplink control information (UCI) resource determination.

62. The apparatus of claim 61, wherein the indication is received in at least one of:
one or more bits of downlink control information (DCI) that schedules a message 2 communication of the four-step RACH procedure,
one or more bits or one or more fields of downlink control information (DCI) that schedules the msg3 communication, or
a system information message associated with RACH configuration.

63. The apparatus of claim 53, wherein the repetitions of the msg3 communication are repetitions of a physical uplink shared channel (PUSCH) carrying a msg3.

64. An apparatus for wireless communication at a base station, comprising:
means for transmitting, to a user equipment (UE) and in a physical downlink control channel (PDCCH), a message 2 (msg2) communication of a four-step random access channel (RACH) procedure; and
means for receiving, from the UE, repetitions of a message 3 (msg3) communication of the four-step RACH procedure, wherein a number of the repetitions are based at least in part on a value of an aggregation level associated with the PDCCH.

65. The apparatus of claim 64, wherein the PDCCH carries downlink control information (DCI) that schedules the msg2 communication.

66. The apparatus of claim 65, wherein the msg3 communication is an initial transmission or a retransmission.

67. The apparatus of claim 64, wherein the PDCCH carries downlink control information (DCI) that schedules the msg3 communication.

68. The apparatus of claim 67, wherein the msg3 communication is a retransmission.

69. The apparatus of claim 64, wherein the number of the repetitions of the msg3 communication is a first number of the repetitions of the msg3 communication when a value of the aggregation level is a first aggregation level, and the number of the repetitions of the msg3 communication is a second number of the repetitions of the msg3 communication when the aggregation level is a second aggregation level.

70. The apparatus of claim 64, wherein the number of the repetitions of the msg3 communication is a first number of the repetitions of the msg3 communication when a value of the aggregation level satisfies a threshold value, and the number of the repetitions of the msg3 communication is a second number of the repetitions of the msg3 communication when the aggregation level does not satisfy the threshold value.

71. The apparatus of claim 64, wherein uplink control information (UCI) is multiplexed with the msg3 communication, the UCI indicating at least one of:
  a number of the repetitions of the msg3 communication,
  a downlink quality measurement, or
  a power headroom report.

72. The apparatus of claim 64, further comprising:
  means for transmitting an indication of a beta factor that is to be used for uplink control information (UCI) resource determination.

73. The apparatus of claim 72, wherein the indication is transmitted in at least one of:
  one or more bits of downlink control information (DCI) that schedules the msg2 communication,
  one or more bits or one or more fields of downlink control information (DCI) that schedules the msg3 communication, or a system information message associated with RACH configuration.

74. The apparatus of claim 64, wherein the repetitions of the msg3 communication are repetitions of a physical uplink shared channel (PUSCH) carrying a msg3.

\* \* \* \* \*